Dec. 17, 1968   D. T. SIEMS   3,416,363
METHOD AND APPARATUS FOR DETERMINING THE
DYNAMIC QUALITIES OF ELASTIC MATERIALS
Filed Oct. 17, 1966
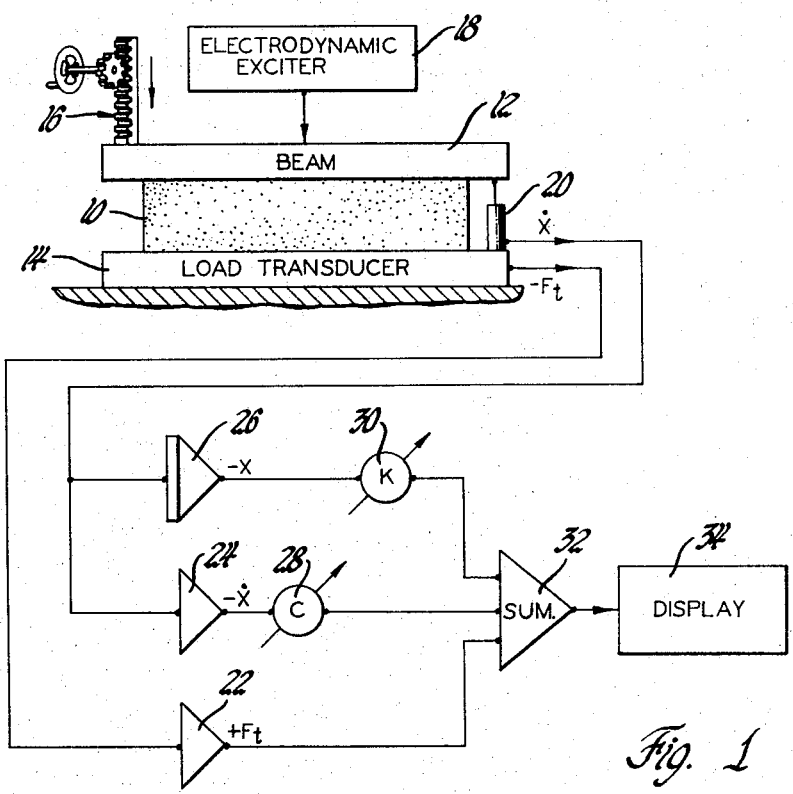
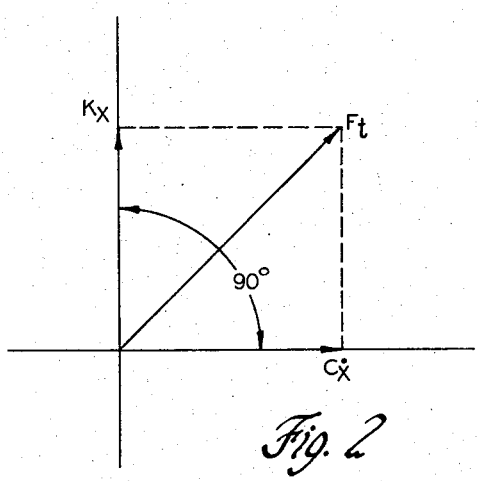
INVENTOR.
David T. Siems
BY
Thomas N. Young
ATTORNEY

United States Patent Office 3,416,363
Patented Dec. 17, 1968

3,416,363
METHOD AND APPARATUS FOR DETERMINING THE DYNAMIC QUALITIES OF ELASTIC MATERIALS
David T. Siems, Highland, Mich., assignor to General Motors Corporation, Detroit, Mich., a corporation of Delaware
Filed Oct. 17, 1966, Ser. No. 587,185
3 Claims. (Cl. 73—67.1)

ABSTRACT OF THE DISCLOSURE

Technique for determining damping coefficient and spring rate of elastic parts without requirement to attain resonance. Transmitted force is equated to the vectorial sum of displacement rate multiplied by damping coefficient and displacement multiplied by spring rate. A simple electronic computer system is disclosed.

Summary of the invention

This invention relates to a method and apparatus for determining the dynamic qualities of samples or parts of elastic material, such as rubber, by subjecting the part to a vibratory load at a known repetition rate and measuring certain quantities across the sample.

It is often necessary to determine the dynamic qualities of elastic materials, such as rubber, in order to ascertain the suitability of such materials for use in structural combinations. Dynamic qualities, such as damping coefficient and spring rate, are generally determined by subjecting the part to a vibratory load at the resonant frequency of a test system which includes both the part and the beam through which the load is applied. This method of testing limits the test to a specific frequency, that is, the resonant frequency of the system, and further requires precise knowledge of the beam parameters in order to isolate the beam from the part under test in calculating the dynamic qualities from the measured quantities.

In accordance with the present invention, the spring rate and damping coefficient of a sample or part of elastic material may be quickly and accurately obtained without the need for establishing a resonant condition and in such a fashion as to essentially exclude the beam parameters from consideration. Further, the final determination of the aforementioned dynamic qualities, spring rate and damping coefficient can be made from only two measured quantities both of which are measured across the sample.

In general, the above objectives of the invention are accomplished by subjecting the elastic sample to a vibratory load at a known repetition rate, measuring the load transmitted through the sample and the displacement rate of the sample in response to the load, determining the displacement of the sample and from these quantities determining the spring rate and damping coefficients. In a specific embodiment of the invention, these quantities are related according to the realtion $$C\dot{x} + Kx - F_t = 0$$

where

C is the damping coefficient
K is the spring rate
$\dot{x}$ is sample displacement rate
$x$ is sample displacement
$F_t$ is load transmitted across the sample.

In accordance with the invention, apparatus is presented through which the desired determination of dynamic qualities can be quickly made by weighting the measured quantities according to the relation stated by the above formula.

The invention as well as further objects and advantages thereof may be best understood from the following description of a specific embodiment. This description is to be taken with the accompanying drawings of which:

FIGURE 1 is a schematic diagram of apparatus which may be used in carrying out the determination of the dynamic qualities in accordance with the invention; and FIGURE 2 is a vector diagram showing the relationship between the quantities measured with the FIGURE 1 apparatus.

In this application, the terms force and load shall be used interchangeably. Referring to FIGURE 1, a sample 10 of resilient material such as rubber is sandwiched between a load applying beam 12 and a force or load transducer 14 which rests on a reference surface as indicated. The beam 12 bears against the upper surface of sample 10 and is maintained in contact therewith by preloading the beam 12 by adjustment of means schematically indicated at 16. The beam 12 may be excited by an electrodynamic exciter 18 to subject sample 10 to a vibratory load which compresses sample 10 at a known repetition rate. It is immaterial for purposes of dynamic quality determination whether the repetition rate corresponds with the resonant frequency of the system including sample 10, beam 12 and exciter 18. However, the system may be operated at or near resonance for the purpose of obtaining maximum force output from a small capacity exciter at 18. A resonant beam tester may be used if modified to allow adjustable preload through the addition of steel springs. Resonant frequency adjustment may be accomplished by adding or subtracting mass from the beam.

The load transducer 14 produces an output signal $F_t$ which is an analog representation of the force or load transmitted across sample 10. A linear velocity transducer 20 connected between beam 12 and load transducer 14 produces an output signal $\dot{x}$ which is an analog representation of the displacement rate across sample 10. From these two signal quantities the spring rate K and the damping coefficient C can be calculated in accordance with the phase relationship shown in FIGURE 2.

Knowing the phase and amplitude of the total transmitted force and the phase and amplitude of the velocity, the velocity may be integrated to yield displacement and $C\dot{x} + Kx - F_t = 0$ can be solved for the coefficients K and C. This can be done conveniently with the aid of the analog computer circuitry shown in FIGURE 1.

In FIGURE 1, the transmitted load signal $F_t$ is inverted and amplified at 22 and applied to the first input of a summing amplifier 32. The velocity signal $\dot{x}$ is amplified and inverted at 24 and transmitted through a variable potentiometer 28 to a second input of summing amplifier 32. Potentiometer 28 multiplies the velocity signal by coefficient C. The velocity signal $\dot{x}$ is also transmitted to an integrating amplifier 26 which produces an output $-x$ corresponding to the displacement across sample 10, that is, the displacement between beam 12 and load transducer 14. The displacement signal $-x$ is transmitted to a variable potentiometer 30 where the displacement signal can be weighted by multiplication with the spring rate coefficient K and applied to the third input of summing amplifier 32. The output of amplifier 32 may be connected to a display device 34 such as an oscilloscope.

As can be seen from $C\dot{x} + Kx - F_t = 0$ and FIGURE 2, the output of summing amplifier 32 is a minimum whenever the potentiometers 28 and 30 are adjusted such that the multiplying coefficients C and K cause the sum of the spring rate vector and the damping vector to equal the transmitted force vector. This may be conveniently accomplished by alternate adjustment of the potentiometers 28 and 30 to ultimately produce a minimized signal as displayed at 34. The potentiometers 28 and 30 may be precalibrated such that the spring rate and damping coefficient may be read directly therefrom thus precluding the introduction of operator error into any calculations which may otherwise be required.

It is to be understood that the foregoing description of a specific embodiment of the invention is illustrative only and is not to be construed in a limiting sense. For a definition of the invention, reference should be had to the appended claims.

What is claimed is:

1. Apparatus for determining the damping coefficient and spring rate of a sample of resilient material such as rubber including a load-applying first member adapted to be brought into contact with one surface of the sample, means for applying a vibratory load to the first member thereby to compress the sample at a known repetition rate, a load measuring second member adapted to contact another surface of the sample opposite said one surface for producing a first signal indicating the force transmitted across the sample, transducer means connected between the first and second members for producing a second signal indicating the relative velocity between the members, and computer means comprising a first channel for receiving the first signal and producing a first output representing transmitted force, a second channel for receiving the second signal and including therein means for multiplying the second signal by a first variable quantity representing damping coefficient thereby to produce a second output, a third channel for receiving the second signal and including therein means for integrating the second signal and means for multiplying the integrated second signal by a second variable quantity representing spring rate thereby to produce a third output, and means for indicating substantial equivalence between the first channel output and the vectorial sum of the second and third outputs thereby to indicate damping coefficient and spring rate as a function of the magnitudes of the first and second variable quantities, respectively, which result in said substantial equivalence.

2. Apparatus as defined in claim 1 wherein the means for multiplying the second and integrated second signals are variable potentiometers.

3. A method of determining the damping coefficient and spring rate of a sample of resilient material such as rubber comprising the steps of placing the sample between two rigid members, applying a vibratory load of known force and repetition rate to the sample through one of the members, generating a first signal representing the load transmitted across the sample, generating a second signal representing the displacement rate of the sample in response to the load, variably weighting the second signal with a quantity representing damping coefficient, generating a third signal representing the displacement of the sample in response to the load, variably weighting the third signal with a quantity representing spring rate, vectorially adding the second and third signals and comparing the sum to the first signal, and determining damping coefficient and spring rate as a function of the degree of weight applied to the second and third signals, respectively, to produce substantial equivalence between the first signal and said sum.

References Cited

UNITED STATES PATENTS

| | | | |
|---|---|---|---|
| 2,733,596 | 2/1956 | Painter | 73—67.1 |
| 3,030,803 | 4/1962 | Painter | 73—67.1 |
| 3,194,064 | 7/1965 | Miles | 73—101 |
| 3,256,741 | 6/1966 | Wise | 73—89 |

RICHARD C. QUEISSER, *Primary Examiner.*

JAMES H. WILLIAMSON, *Assistant Examiner.*

U.S. Cl. X.R.

73—101